United States Patent
Kim et al.

(10) Patent No.: US 8,359,059 B2
(45) Date of Patent: Jan. 22, 2013

(54) METHOD OF CONTROLLING UPLINK POWER IN WIRELESS COMMUNICATION SYSTEM

(75) Inventors: Dong Cheol Kim, Anyang-si (KR); Min Seok Noh, Anyang-si (KR); Yeong Hyeon Kwon, Anyang-si (KR); Jin Sam Kwak, Anyang-si (KR); Sung Ho Moon, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 13/002,648

(22) PCT Filed: Jul. 8, 2009

(86) PCT No.: PCT/KR2009/003737
§ 371 (c)(1),
(2), (4) Date: Jan. 4, 2011

(87) PCT Pub. No.: WO2010/005236
PCT Pub. Date: Jan. 14, 2010

(65) Prior Publication Data
US 2011/0117953 A1 May 19, 2011

Related U.S. Application Data

(60) Provisional application No. 61/222,065, filed on Jun. 30, 2009, provisional application No. 61/173,218, filed on Apr. 28, 2009, provisional application No. 61/156,885, filed on Mar. 3, 2009, provisional application No. 61/078,790, filed on Jul. 8, 2008.

(51) Int. Cl.
*H04B 7/00* (2006.01)
(52) U.S. Cl. ........... 455/522; 455/69; 455/70; 455/13.4; 370/315; 370/316; 370/317; 370/318; 370/319

(58) Field of Classification Search .......... 455/522, 455/69–70, 13.4; 370/315–320
See application file for complete search history.

(56) References Cited

U.S. PATENT DOCUMENTS

| | | |
|---|---|---|
| 7,917,164 B2 | 3/2011 | Rao |
| 2006/0003787 A1 | 1/2006 | Heo et al. |
| 2006/0046789 A1 | 3/2006 | Huh et al. |
| 2006/0111119 A1 | 5/2006 | Iochi |
| 2006/0268789 A1 | 11/2006 | Yu et al. |
| 2007/0082620 A1 | 4/2007 | Zhang et al. |
| 2007/0178930 A1 | 8/2007 | Xiao et al. |
| 2007/0275727 A1 | 11/2007 | Lee et al. |

(Continued)

FOREIGN PATENT DOCUMENTS

| | | |
|---|---|---|
| WO | 2007-129941 A1 | 11/2007 |
| WO | 2007-149616 A1 | 12/2007 |

OTHER PUBLICATIONS

In the U.S. Appl. No. 12/996,007, Non-Final Office Action dated Nov. 9, 2012, 16 pages.

(Continued)

*Primary Examiner* — Fayyaz Alam
(74) *Attorney, Agent, or Firm* — Lee, Hong, Degerman, Kang & Waimey

(57) ABSTRACT

A method of controlling uplink power in a wireless communication system includes receiving a power control message including parameters for uplink power control from a base station, and controlling uplink power based on the power control message, wherein the uplink power is determined according to a target SINR (Signal to Interference plus Noise Ratio), the target SINR is determined by a minimum rate SINR required at the base station and a control factor for noise and interference. Transmission power of signal can be more accurately controlled and an influence of an inter-cell interference or a path loss can be reduced to thus improve quality of service of the wireless communication system.

12 Claims, 4 Drawing Sheets

U.S. PATENT DOCUMENTS

2007/0293260 A1 12/2007 Xiao et al.
2008/0013476 A1 1/2008 Vasudevan
2008/0057996 A1 3/2008 Sung et al.
2008/0081655 A1 4/2008 Shin et al.
2009/0315779 A1 12/2009 Chin et al.
2010/0234026 A1 9/2010 Tenny et al.
2012/0028673 A1* 2/2012 Jeong .......................... 455/522
2012/0115535 A1* 5/2012 Jeong et al. ................... 455/522

OTHER PUBLICATIONS

In the U.S. Appl. No. 12/996,974, Non-Final Office Action dated Oct. 30, 2012, 17 pages.

* cited by examiner

METHOD OF CONTROLLING UPLINK POWER IN WIRELESS COMMUNICATION SYSTEM

CROSS-REFERENCE TO RELATED APPLICATIONS

This application is a 371 U.S. national stage application of International Application No. PCT/KR2009/003737, filed on Jul. 8, 2009, which claims priority to U.S. Provisional Application Ser. Nos. 61/222,065, filed on Jun. 30, 2009, 61/173,218, filed on Apr. 28, 2009, 61/156,885, filed on Mar. 3, 2009, and 61/078,790, filed on Jul. 8, 2008, the contents of which are incorporated by reference herein in their entirety.

TECHNICAL FIELD

The present invention relates to wireless communications, and more particularly, to a power control method of transmitting data with proper transmission power.

BACKGROUND ART

A next-generation multimedia wireless communication system, which is being actively studied, is required to process various information such as images, wireless data, or the like, at a high data transmission rate, beyond the voice-oriented services provided at an early stage.

Thus, recently, orthogonal frequency division multiplexing (OFDM) exerting a high data rate receives much attention. The OFDM is a multi-carrier modulation scheme that divides a frequency band into a plurality of orthogonal subcarriers to transmit data. The OFDM can reduce an inter-symbol interference at a low complexity. The OFDM converts serially inputted data symbols into the N parallel data symbols, includes them in the N separated subcarriers, and transmits the same. The subcarriers maintain orthogonality in a frequency domain. The respective orthogonal channels experience mutually independent frequency selective fading, and the intervals of transmitted symbols are lengthened to minimize the inter-symbol interference. Orthogonal frequency division multiple access (OFDMA) refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, frequency resources are mutually exclusively allocated to the users.

The wireless communication system has a cell structure to effectively configure a system. A cell refers to a zone obtained by dividing a wide area into smaller zones to effectively use frequency of the cell. In general, a base station (BS) is installed at the center of the cell to relay a mobile station (MS). The cell refers to a service region provided by a single BS.

The wireless communication system uses a power control scheme to reduce a path loss according to the distance between a BS and a MS and an inter-cell interference by an adjacent cell. The power control scheme is adjusting transmission power to transmit data at the lowest power level while maintaining quality of service (QoS) of the wireless communication system. In particular, MSs located near a cell boundary in the multi-cell environment are much affected by the path loss and the inter-cell interference, so in transmitting data, the MSs should determine proper transmission power not to cause degradation of QoS by a path loss while not interfering with its adjacent cell.

Thus, there is a need for a method of transmitting data with accurate transmission power not to cause degradation of QoS by a path loss while not interfering with its adjacent cell.

DISCLOSURE OF INVENTION

Technical Problem

The present invention provides a power control method for transmitting data with appropriate transmission power to thereby reduce a path loss or an inter-cell interference.

Technical Solution

In an aspect, a method of controlling uplink power in a wireless communication system includes receiving a power control message including parameters for uplink power control from a base station, and controlling uplink power based on the power control message, wherein the uplink power is determined according to a target SINR(Signal to Interference plus Noise Ratio), the target SINR is determined by a minimum rate SINR required at the base station and a control factor for noise and interference.

In another aspect, a mobile station includes a RF unit receiving a power control message including parameters for uplink power control from a base station, and a processor coupled on the RF unit and controlling uplink power based on the power control message, wherein the processor determines uplink power according to a target SINR, the target SINR is determined by a minimum rate SINR required at the base station and a control factor for noise and interference.

Advantageous Effects

Transmission power of signal can be more accurately controlled and an influence of an inter-cell interference or a path loss can be reduced to thus improve quality of service of the wireless communication system.

MODE FOR THE INVENTION

Figure 1:
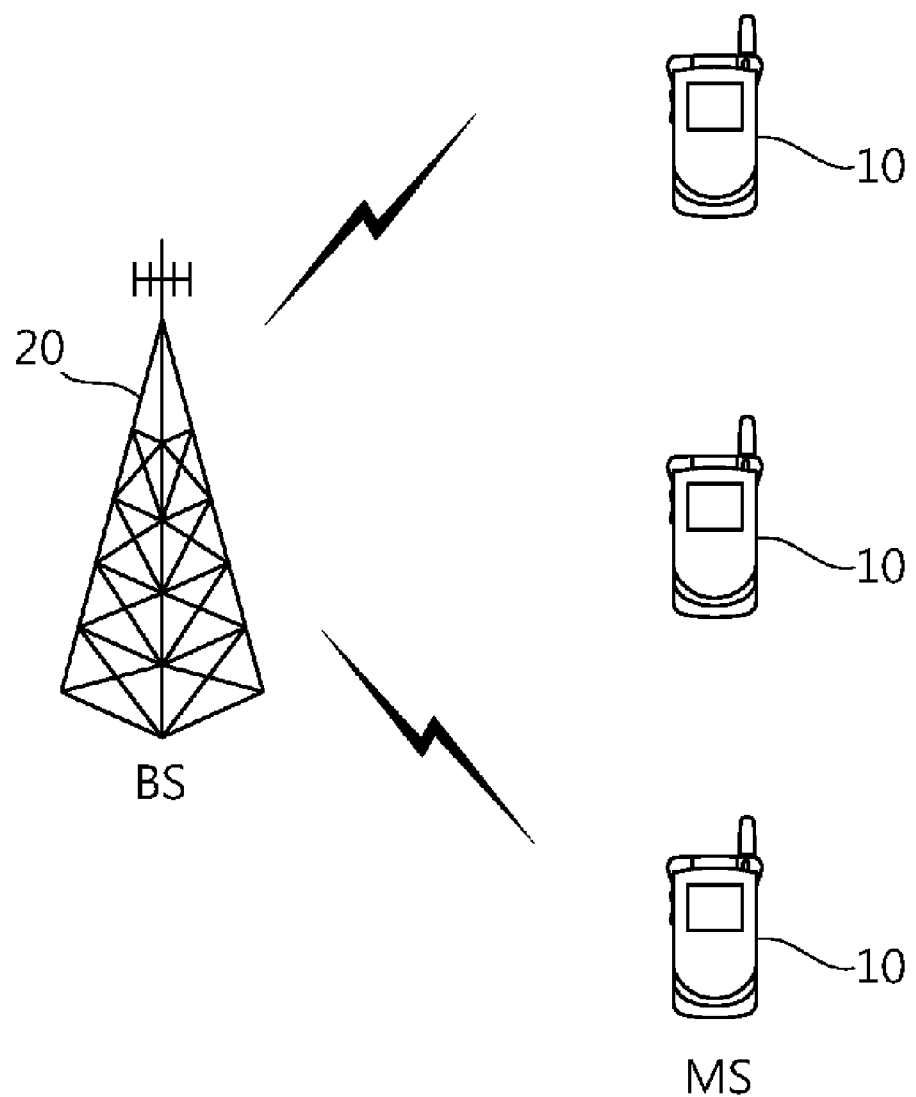
FIG. 1 shows a wireless communication system.

FIG. 1 is a schematic block diagram showing one example of a wireless communication system. The wireless communication system can be widely deployed to provide a variety of communication services, such as voices, packet data, etc.

Referring to FIG. 1, the wireless communication system includes base stations (BS) 20 and mobile stations (MS) 10. The MS 10 may be fixed or have mobility, and may be referred to as another terminology, such as a user equipment (UE), a user terminal (UT), a subscriber station (SS), a wireless device, etc.

The BS 20 generally refers to a fixed station that communicates with the MS 10 and may be called another terminology, such as a node-B, a base transceiver system (BTS), an access point, etc. There are one or more cells within the coverage of the BS 20.

Hereinafter, downlink refers to communication from the BS 20 to the MS 10, and uplink refers communication from the MS 10 to the BS 20. In the downlink, a transmitter may be a part of the BS 20, and a receiver may be a part of the MS 10. In the uplink, the transmitter may be a part of the MS 10, and the receiver may be a part of the BS 20.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes.

Figure 2:
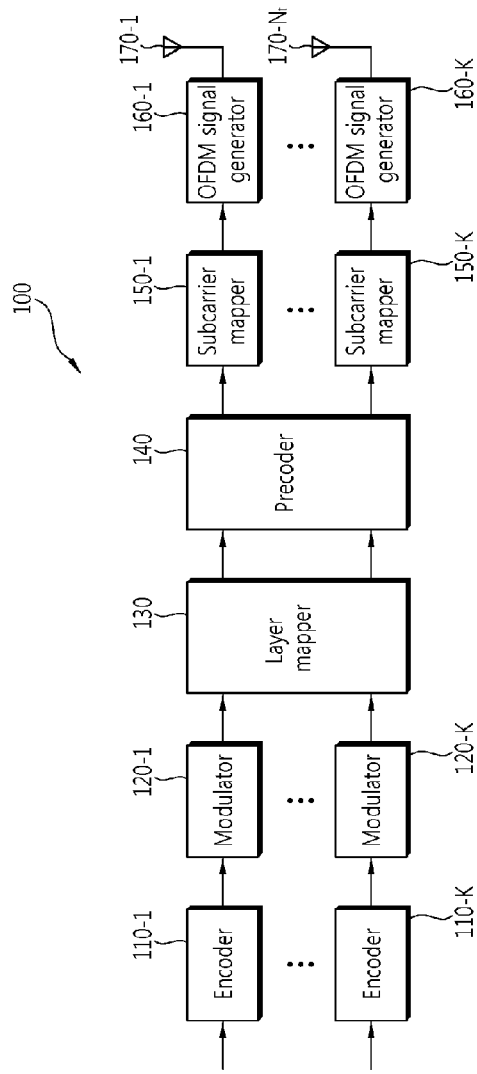
FIG. 2 shows an exemplary structure of a transmitter.

FIG. 2 shows an exemplary structure of a transmitter.

Referring to FIG. 2, a transmitter 100 includes encoders 110-1, ..., 110-K, modulators 120-1, ..., 120-K, a layer mapper 130, a precoder 140, subcarrier mappers 150-1, ..., 150-K, and OFDM signal generators 160-1, ..., 160-K. The transmitter 100 also includes Nt (Nt>1) Tx antennas 170-1, ..., 170-Nt.

The encoders 110-1, ..., 110-K generate coded data by encoding input data according to a predetermined coding scheme. The modulators 120-1, ..., 120-K arrange the coded data into symbols representing locations on a signal constellation. A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM.

The layer mapper 130 defines a layer of an input symbol so that each antenna can distribute a specific symbol to a path of each antenna. The layer is defined as an information path input to the precoder 140. The information path located ahead of the precoder 140 can be called a virtual antenna (or layer).

The precoder 140 processes an input symbol by using a MIMO scheme according to the multiple transmit (Tx) antennas 170-1, ..., 170-Nt. For example, the precoder 140 can use codebook-based precoding. The precoder 140 distributes an antenna-specific symbol to the subcarrier mappers 150-1, ..., 150-K for a path of a specific antenna. Each information path transmitted to one antenna by the precoder 140 by the use of one subcarrier mapper is called a stream. The antenna may be a physical antenna.

The subcarrier mappers 150-1, ..., 150-K allocate input symbols to suitable subcarriers and then multiplex the resultant symbols according to a user. The OFDM signal generators 160-1, ..., 160-K modulate input symbols according to an OFDM scheme and then outputs OFDM symbols. The OFDM signal generators 160-1, ..., 160-K can perform IFFT on input symbols. A cyclic prefix (CP) may be inserted into a time-domain symbol which has undergone the IFFT. The OFDM symbols are transmitted through the respective Tx antennas 170-1, ..., 170-Nt.

In the MIMO system, the transmitter 100 can operate in two modes. One is an SCW mode and the other is an MCW mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than 1.

Figure 3:
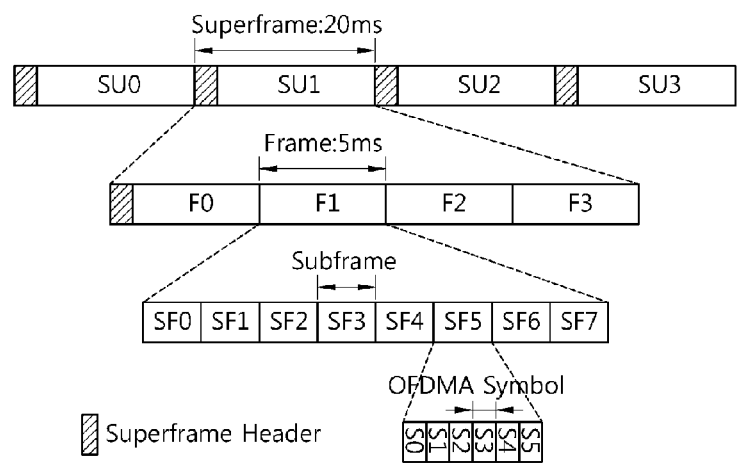
FIG. 3 shows an exemplary structure of a frame structure.

FIG. 3 shows an exemplary structure of a frame structure.

Referring to FIG. 3, a superframe (SU) includes a superframe header (SFH) and four radio frames F0, F1, F2, and F3. Although it is shown that each SU has a size of 20 milliseconds (ms) and each frame has a size of 5 ms, the present invention is not limited thereto. The SFH may be located at a front-most position of the SU. A common control channel is assigned to the SFH. The common control channel is used to transmit information regarding frames constituting the SU or control information (e.g., system information) that can be commonly utilized by all MSs within a cell.

One frame includes 8 subframes SF0, SF1, SF2, SF3, SF4, SF5, SF6, and SF7. Each subframe can be used for uplink or downlink transmission. Each subframe may consist of 6 or 7 OFDMA symbols, but this is for exemplary purposes only. Time division duplexing (TDD) or frequency division duplexing (FDD) may be applied to the frame. In the TDD, each subframe is used for uplink transmission or downlink transmission at the same frequency and at a different time. That is, subframes included in a TDD frame are divided into an uplink subframe and a downlink subframe in a time domain. Thus, uplink transmission and downlink transmission occupy the same frequency band, and can be performed at a different time. In the FDD, each subframe is used for uplink transmission or downlink transmission at the same time and at a different frequency. That is, subframes included in an FDD frame are divided into an uplink subframe and a downlink subframe in a frequency domain. Thus, uplink transmission and downlink transmission occupy different frequency bands, and can be simultaneously performed.

A subframe includes at least one frequency partition. The frequency partition consists of at least one physical resource unit (PRU). The frequency partition may include a contiguous/localized PRU and/or a distributed/non-contiguous PRU. The frequency partition may be used for other purposes such as fractional frequency reuse (FFR) or a multicast or broadcast service (MBS).

The PRU is defined as a basic physical unit for allocating resources including a plurality of physically contiguous OFDMA symbols and a plurality of physically contiguous subcarriers. The number of OFDMA symbols included in the PRU may be equal to the number of OFDMA symbols included in one subframe. For example, when one subframe consists of 6 OFDMA symbols, the PRU may be defined with 18 subcarriers and 6 OFDMA symbols. A logical resource unit (LRU) is a basic logical unit for distributed resource allocation and contiguous resource allocation. The LRU is defined with a plurality of OFDMA symbols and a plurality of subcarriers, and includes pilots used in the PRU. Therefore, one LRU includes a specific number of subcarriers, wherein the specific number depends on the number of allocated pilots.

A distributed resource unit (DRU) may be used to obtain a frequency diversity gain. The DRU includes a distributed subcarrier group in one frequency partition. A physical size of the DRU is equal to a physical size of the PRU. One or more subcarriers may be a minimum unit of physically contiguous subcarriers constituting each distributed subcarrier group in the DRU.

A contiguous resource unit or localized resource unit (CRU) may be used to obtain a frequency selective scheduling gain. The CRU includes a localized subcarrier group. A physical size of the CRU is equal to a physical size of the PRU. The CRU and the DRU may be supported using frequency division multiplexing (FDM) in a frequency domain.

Figure 4:
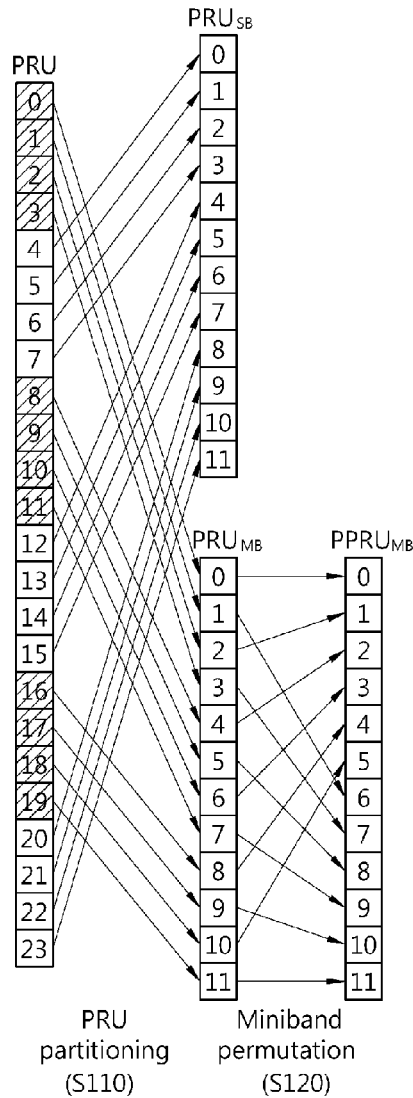
FIG. 4 shows an example of mapping on a physical resource unit.

FIG. 4 shows an example of mapping on a physical resource unit.

Referring to FIG. 4, all subcarriers used in a system bandwidth constitute PRUs. One PRU may include 18 subcarriers in a frequency domain and may include 6 OFDMA symbols or 7 OFDMA symbols in a time domain. The number of subcarriers in a frequency domain included one PRU is not restricted. The number of OFDMA symbols included in the PRU depends on a type of subframe. The type of subframe includes a subframe type-1 including 6 OFDMA symbols and a subframe type-2 including 7 OFDMA symbols. However, the number of OFDMA symbols is not limited thereto, and thus other types of subframe can also be defined by including various numbers of OFDMA symbols, e.g., 5 OFDMA symbols, 9 OFDMA symbols, etc.

PRUs are divided into a subband and a miniband according to a predetermined PRU partitioning rule (step S110). The subband denotes a unit of contiguous PRUs in a frequency domain or a minimum unit for constituting a CRU. A size of the subband in the frequency domain may be 4 PRUs. The miniband denotes a unit of a distributed PRU or a unit for constituting a DRU. A size of the miniband in the frequency domain may be 1 PRU or a multiple integer of the PRU. All PRUs can be assigned as the subband or the miniband by being selected in a 4-PRU unit corresponding to the size of the subband. PRUs belonging to the subband are referred to as $PRU_{SB}$, and PRUs belonging to the miniband are referred to as $PRU_{MB}$. The number of all PRUs is equal to the sum of the number of $PRU_{SB}$ and the number of $PRU_{MB}$. The $PRU_{SB}$ of the subband and the $PRU_{MB}$ of the miniband are reordered. The $PRU_{SB}$ of the subband is numbered from 0 to (the number of $PRU_{SB}-1$). The $PRU_{MB}$ of the miniband is numbered from 0 to (the number of $PRU_{MB}-1$).

The $PRU_{MB}$ of the miniband is subjected to miniband permutation so that the PRUMB is permutated in a frequency domain to ensure frequency diversity in each frequency partition (step S120). That is, the numbered $PRU_{MB}$ is permutated to generate a permuted-$PRU_{MB}$ ($PPRU_{MB}$) according to a predetermined permutation rule (or mapping rule).

Thereafter, the $PRU_{SB}$ and the $PRU_{MB}$ are assigned to one or more frequency partitions. Each frequency partition is subjected to a cell-specific resource mapping process such as CRU/DRU allocation, sector-specific permutation, subcarrier permutation, etc.

Hereinafter, an uplink power control method will be described.

Uplink power control is supported for both an initial calibration and periodic adjustment on transmit power without loss of data. The uplink power control algorithm determines the transmission power of an OFDM symbol to compensate for the path loss, shadowing and fast fading. Uplink power control shall intend to control an inter-cell interference level.

A transmitting MS shall maintain the same transmitted power density, unless the maximum power level is reached. In other words, when the number of active LRU allocated to a user is reduced, the total transmitted power shall be reduced proportionally by the MS, without additional power control messages. When the number of LRU is increased, the total transmitted power shall also be increased proportionally. However, the transmitted power level shall not exceed the maximum levels dictated by signal integrity considerations and regulatory requirements. The MS shall interpret power control messages as the required changes to the transmitted power density.

For interference level control, current Interference plus noise over Thermal noise (IoT) level of each cell may be shared among BSs.

A power control scheme may be divided into an open loop power control (OLPC) and a closed loop power control (CLPC). The closed loop power control scheme is increasing or decreasing power according to a power control message transmitted from the BS. The open loop power control scheme is allowing the MS to directly determine transmission power based on various factors without receiving a direct up/down command from the BS. Of course, the MS receives required information from the BS. For example, the MS receives information about an interference level of uplink or a particular offset from the BS. In addition, the MS may receive more information from the BS as necessary. Based on those information, the MS determines the next transmission power.

Figure 5:
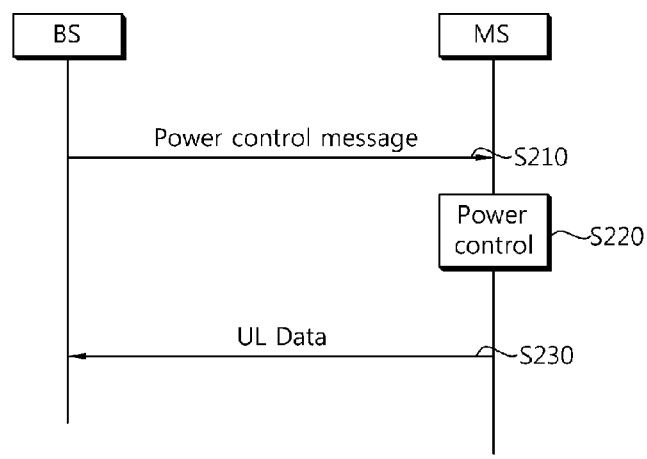
FIG. 5 shows an uplink open loop power control method according to one embodiment of the present invention.

FIG. 5 shows an uplink open loop power control method according to one embodiment of the present invention.

Referring to FIG. 5, a base station (BS) transmits a power control message (S210). The power control message includes parameters for uplink (UL) power control. The power control message can be a mobile station (MS) specific message which is unicast to a specific MS or a common message which is broadcast to common MSs.

The MS performs UL power control based on the power control message received from the BS (S220). When the open-loop power control is used, the power per subcarrier and per transmission antenna or the power per subcarrier and per stream shall be maintained for the UL transmission as indicated in Equation 1.

MathFigure 1

$$P(\text{dBm}) = L + \text{SINR}_{Target} + NI + \text{OffsetAMS}_{perAMS} + \text{OffsetABS}_{perAMS} \quad [\text{Math.1}]$$

Herein $SINR_{Target}$ is a target UL signal to interference plus noise ratio (SINR) received by the BS. A mode used to calculate the target UL SINR value is signaled through the power control message. P is Tx power level per subcarrier per stream for current transmission. L is an estimated average current uplink propagation loss. It includes MS's Tx antenna gain and path loss. NI is an estimated average power level of noise and interference per subcarrier at the BS, not including BS's receive (Rx) antenna gain. In general, the NI is information broadcast at the BS, but also it can be signaled to the MS on the power control message OffsetAMS$_{perAMS}$ is a correction term for MS specific power offset controlled by the MS. Its initial value can be zero OffsetABS$_{perAMS}$ is a correction term for MS specific power offset controlled by the BS through the power control message. The estimated average current UL propagation loss, L, can be calculated based on total power received on active subcarriers of a frame preamble.

The UL power can be determined by the target UL SINR. When the user connects to network, the parameters for UL power control are negotiated using equation 2.

MathFigure 2

$$SINR_{Target} = \begin{cases} 10\log_{10}\left(\max\left(10^{\wedge}\left(\frac{SINR_{MIN}(\text{dB})}{10}\right), \gamma_{IoT} \times SINR_{DL} - \alpha\right)\right) - \beta \times 10\log_{10}(TNS), & \text{OLPC Mode 1} \\ C/N - 10\log_{10}(R), & \text{OLPC Mode 2} \end{cases} \quad [\text{Math. 2}]$$

Herein, C/N is normalized Carrier to Noise (C/N) of modulation/FEC (forward error correction) ratio for the current transmission. R is the number of repetitions for the modulation/FEC rate.

OLPC Mode 1 is the target SINR value for IoT control and tradeoff between overall system throughput and cell edge performance. OLPC Mode 1 can be decided by the control parameter $\gamma_{IoT}$ and $SINR_{MIN}$. The $SINR_{MIN}$ is the SINR requirement for the minimum rate expected by the BS. In another words, the $SINR_{MIN}$ is a minimum SINR for enhancement of throughput at cell edge MSs. The $SINR_{MIN}$ can be set by power control message unicast at the BS. The $SINR_{MIN}$ has 4 bits to represent the value in dB. For example, The $SINR_{MIN}$ is set the value in dB among $\{-\infty, -3, -2.5, -2, -1.5, -1, 0, 0.5, 1, 1.5, 2, 2.5, 3, 3.5, 4, 4.5\}$. The throughput at cell edge MSs can be enhanced by setting the minimum SINR.

The $\gamma_{IoT}$ is the fairness and IoT control factor. The $\gamma^{IoT}$ can be broadcast by the BS. $SINR_{DL}$ is the ratio of a downlink signal over noise and interference power, measured by the MS. Therefore, the $\gamma_{IoT}$ is a control factor for the noise and interference power. The $\gamma_{IoT}$ can have 4 bits to represent the value among $\{0, 0.1, 0.2, 0.3, 0.4, 0.5, 0.6, 0.7, 0.8, 0.9, 1.0, 1.1, 1.2, 1.3, 1.4, 1.5\}$. The $\gamma_{IoT}$ can be different for each frequency partition.

The overall throughput is increased when the $\gamma_{IoT}$ value is large, but the throughput of cell edge MSs can be decreased caused by the increment of maximum power of cell middle MSs. Therefore, the $\gamma_{IoT}$ value can be determined by considering state of overall MSs at the BS.

α is a factor according to the number of receive antennas at the BS. The α can be broadcast at the BS. The α can be signaled from media access control (MAC) power control mode signaling. The α can be 3 bits to expressed $\{1, \frac{1}{2}, \frac{1}{4}, \frac{1}{8}, \frac{1}{16}, 0, \text{reserved}, \text{reserved}\}$.

β is set to be zero or one by one bit of MAC power control mode signaling. The β has an on/off function for total number of streams (TNS). That is, the β is a stream factor indicating whether the TNS is applied or not. The β can be determined and transmitted by the BS.

TNS is the total number of streams in the LRU indicated by UL MAP information. The TNS can be unicast at the BS. In case of SU-MIMO, the TNS value can be set to Mt where Mt is the number of streams per user. In case of collaborated spatial multiplexing (CSM), the TNS value can be set to one.

Table 1 is an example of the normalized C/N per modulation.

TABLE 1

| Modulation/FEC rate | Required C/N |
|---|---|
| ACK/NAK | −3.0 |
| CQI | 0 |
| MAP ACK/NAK | 0 |
| Ranging code | 3 |
| QPSK ⅓ | 0.5 |
| QPSK ½ | 6 |
| QPSK ⅔ | 7.5 |
| QPSK ¾ | 9 |
| 16-QAM-½ | 12 |
| 16-QAM-⅔ | 14.5 |
| 16-QAM-¾ | 15 |
| 16-QAM-⅚ | 17.5 |
| 64-QAM-½ | 18 |
| 64-QAM-⅔ | 20 |
| 64-QAM-¾ | 21 |
| 64-QAM-⅚ | 23 |

The MS transmits UL data after controlling UL Tx power based on the proposed method explained above (S230). The UL data includes user data and control information. That is, transmission power of the user data or the control information can be controlled according to the proposed UL Tx power control method.

In addition, uplink open-loop power control for system performance improvement, inter-cell interference control, performance improvement in a cell edge, etc., can be configured with a unified algorithm. Hereinafter, a proposed uplink power control method is based on single-stream transmission, and in case of multiple streams, an additional operation of $-10 \log_{10}(MT_T)$ is performed on a finally determined value or a proper mean value. This takes a role of allowing interference of multiple streams for multiple users with the same resource to be decreased to an interference level of a single stream for a single user. The uplink power control can be performed using minimum control information.

Equation 3 shows an example of UL Tx power in single-stream transmission.

MathFigure 3

$$P_{tx} = PL + NI + \gamma_{IoT} + SIR_{DL}(\text{or } SINR_{DL}) + \text{Offset}_{AMS\_perAMS} + \text{Offset}_{ABS\_perABS} \quad [\text{Math.3}]$$

Herein, $P_{Tx}$ denotes an MS's Tx power level per stream to achieve a given desired SINR. The $\gamma_{IoT}$ is the fairness and IoT control factor and can be broadcast by the BS. Also, the γIoT can be broadcast per frequency partition in considering of frequency partitions. $SIR_{DL}$ (or $SINR_{DL}$) is a estimated downlink SIR (signal to interference ratio) or SINR.

Equations 4 to 8 show an example of a method of obtaining UL Tx power.

MathFigure 4

$$P_{tx} = PL_s + NI + (SINR_{target}, \max(SINR_{min}(SINR_{target}, \Delta IoT_{max} + N_0 + SIR_{DL}))) + \text{Offset}_{perAMS} + \text{Offset}_{perABS} - 10 \log_{10}(MT_T) \quad [\text{Math.4}]$$

Herein, $PL_s$ denotes a path loss estimated for a serving cell by the MS. $PL_i$ denotes a path loss estimated for the strongest interfering cell by the MS. $MT_T$ corresponds to TNS, and denotes the number of streams indicated by UL MAP information. In case of SU-MIMO, $MT_T$ may be set to the number of streams per user. In case of CSM, $MT_T$ may be set to the total number of streams. In case of control channel transmission, $MT_T$ may be set to 1.

MathFigure 5

$$P_{tx} = PL_s + NI + (SINR_{target}, \max(SINR_{min}, \min (SINR_{target}\Delta IoT_{max} + N_0 + SIR_{DL} - 10 \log_{10}(MT_T)))) + \text{Offset}_{perAMS} + \text{Offset}_{perABS} \quad [\text{Math.5}]$$

MathFigure 6

$$P_{tx} = PL_s + NI + (SINR_{target}, \max(SINR_{min}, \min (SINR_{target}\Delta IoT_{max} + N_0 + SIR_{DL}) + \text{Offset}_{perAMS} + \text{Offset}_{perABS})) - 10 \log_{10}(MT_T) \quad [\text{Math.6}]$$

MathFigure 7

$$P_{tx} = PL_s + NI + (SINR_{target}, \max(SINR_{min}, \min (SINR_{target}\Delta IoT_{max} + N_0 + SIR_{DL}) - 10 \log_{10}(MT_T)) + \text{Offset}_{perAMS} + \text{Offset}_{perABS})) \quad [\text{Math.7}]$$

MathFigure 8

$$\Delta IoT_{max} = IoT_{max} - NI \quad [\text{Math.8}]$$

In Equations 4 to 8, two options are applied to parameters taking a role of $SINR_{Target}$ of Equation 3. The following equation may be defined so that a BS can initially determine a power control mode of an MS.

$(SINR_{target}, max(SINR_{min}, min(SINR_{target}, \Delta IoT_{max}+N_0+SIR_{DL})))$ Alternatively, if an initially determined value is not $SINR_{Target}$, the following equation may be defined so that the MS can request the BS a specific mode.

$max(SINR_{min}, min(SINR_{target}, \Delta IoT_{max}+N_0+SIR_{DL}))$

Equations 3 and 4 are identified according to positions of two parameters identified by an offset. Equations 4 and 5 are identified according to a position of $MT_T$. Equations 6 and 7 can be identified according to the same concept. This is a factor for determining whether multiple streams shall be always considered in a determined $P_{Tx}$.

Equations 9 to 12 show another example of a method of obtaining UL Tx power.

MathFigure 9

$$P_{tx}=PL_s+NI+(SINR_{target}, max(SINR_{min}, \Delta IoT_{max}+N_0+SIR_{DL}))+Offset_{perAMS}+Offset_{perABS}-10\log_{10}(MT_T) \quad [Math.9]$$

MathFigure 10

$$P_{tx}=PL_s+NI+(SINR_{target}, max(SINR_{min}, \Delta IoT_{max}+N_0+SIR_{DL})-10\log_{10}(MT_T))+Offset_{perAMS}+Offset_{perABS} \quad [Math.10]$$

MathFigure 11

$$P_{tx}=PL_S+NI+(SINR_{target}, max(SINR_{min}, \Delta IoT_{max}+N_0+SIR_{DL})+Offset_{perAMS}+Offset_{perABS})-10\log_{10}(MT_T) \quad [Math.11]$$

MathFigure 12

$$P_{tx}=PL_S+NI+(SINR_{target}, max(SINR_{min}, \Delta IoT_{max}+N_0+SIR_{DL}-10\log_{10}(MT_T))+Offset_{perAMS}+Offset_{perABS}) \quad [Math.12]$$

In Equations 9 to 12, in a mode where $SINR_{Target}$ is not selected, $SINR_{MIN}$ and $\Delta IoT_{max}+N_0+SIR_{DL}$ are directly compared with each other and a grater value of the two values is used in replacement of $SINR_{Target}$.

Equation 13 shows another example of a method of obtaining UL Tx power.

MathFigure 13

$$P^{tx}=max[P_{min}, min(P_{tx1}, P_{tx2})]$$

$$P_{min}=SINR_{min}+NI+PL_S$$

$$P_{tx1}=SINR_{tar}+NI+PL_s+\Delta offset_{MS}+\Delta offset_{BS}$$

$$P_{tx2}=IoT_{max}+PL_S+N_0+SIR-10\log_{10}(MT_T)\ (MT=1) \quad [Math.13]$$

$P_{min}$, $P_{tx1}$, and $P_{tx2}$ are compared with one another to determine $P_{tx}$. $P_{tx1}$ may have the same definition as in Equation. If $MT_T=1$, $P_{tx2}$ may take the same role as $\Delta IoT_{max}+N_0+SIR_{DL}$ of Equation 4.

Figure 6:
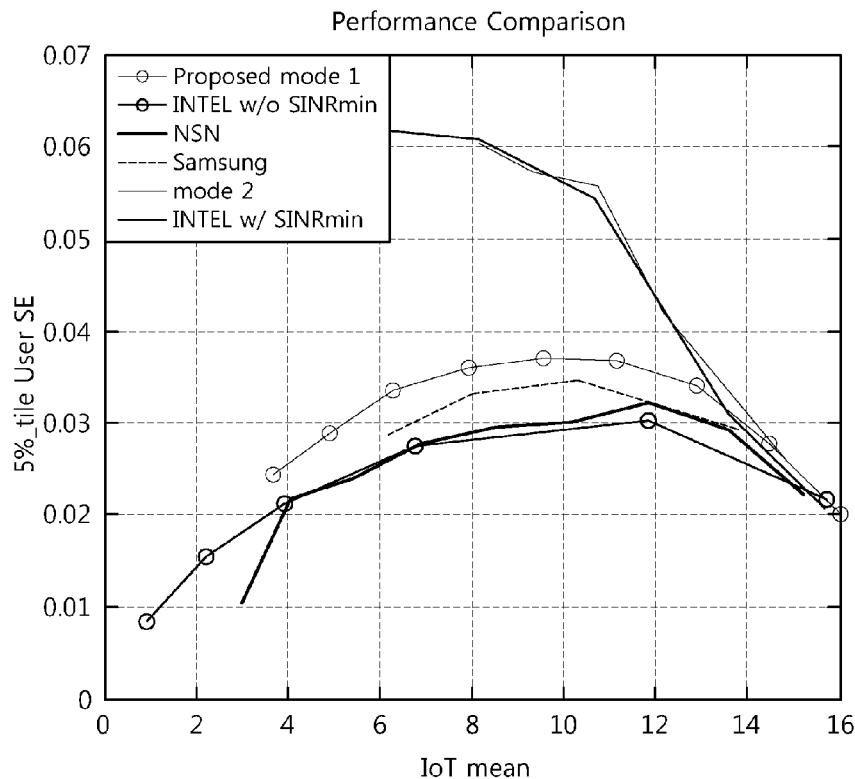
FIG. 6 is a graph showing a result of performing uplink power control according to one embodiment of the present invention.

FIG. 6 is a graph showing a result of performing uplink power control according to one embodiment of the present invention. It is appeared that the throughput of proposed OLPC mode 1 is superior to other methods.

Figure 7:
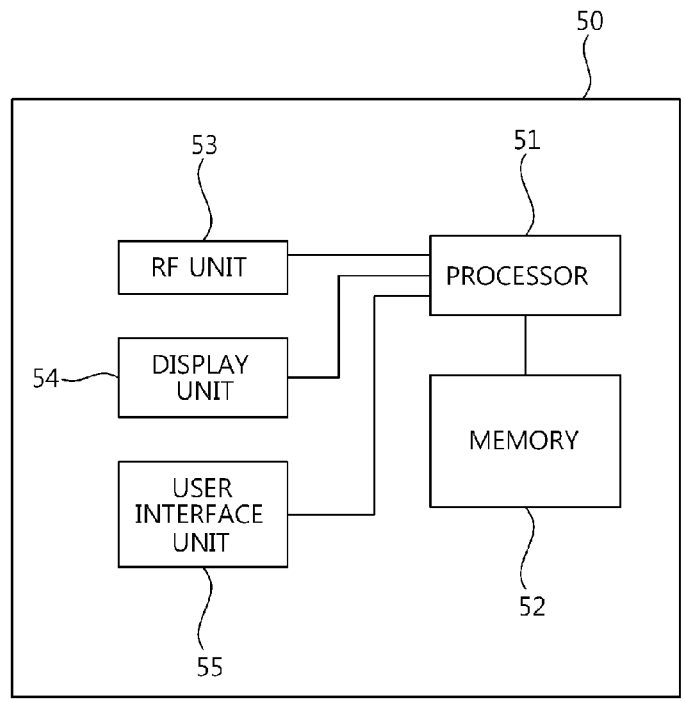
FIG. 7 is a block diagram showing constitutional elements of a mobile station (MS).

FIG. 7 is a block diagram showing constitutional elements of an MS.

Referring to FIG. 7, an MS 50 includes a processor 51, a memory 52, a radio frequency (RF) unit 53, a display unit 54, and a user interface unit 55. The processor 51 implements layers of a radio interface protocol, and provides a control plane and a user plane. The function of each layer can be implemented in the processor 51. The processor 51 performs the proposed UL power control method.

The memory 52 is coupled to the processor 51 and stores an operating system, applications, and general files. The display unit 54 displays a variety of information of the MS and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the MS and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the MS and the network. The MS and the network exchange RRC messages via the RRC layer.

Every function as described above may be performed by processors such as a micro-processor, a controller, a micro-controller, an ASIC (Application Specific Integrated Circuit), and the like, based on software coded to perform such functions or program codes. Designing, developing, and implementing the codes may be obvious to the person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method of controlling uplink power in a wireless communication system, the method comprising:
receiving a power control message including parameters for uplink power control from a base station; and
controlling uplink power based on the power control message, wherein the uplink power is determined according to a target SINR (Signal to Interference plus Noise Ratio), the target SINR is determined by a minimum rate SINR required at the base station and a control factor for noise and interference.

2. The method of claim 1, wherein the minimum rate SINR is unicast at the base station.

3. The method of claim 1, wherein the control factor for noise and interference is broadcast at the base station.

4. The method of claim 1, wherein the target SINR is adjusted according to a stream factor indicating whether total number of streams are applicable or not.

5. The method of claim 1, wherein the uplink power is determined by equation shown below:

$$P(dBm)=L+SINR_{Target}+NI+OffsetAMS_{perAMS}+OffsetABS_{perAMS}$$

wherein P is transmission power level per subcarrier per stream for current transmission, L is a estimated average current uplink propagation loss, $SINR_{Target}$ is the target SINR, NI is a estimated average power level of noise and interference per subcarrier at the base station, OffsetAMS$_{perAMS}$ is a correction term for a mobile station specific power offset controlled by the mobile station, and OffsetABS$_{perAMS}$ is a correction term for the mobile station specific power offset controlled by the base station.

6. The method of claim 1, wherein the target SINR is determined by equation shown below:

$$SINR_{Target} = 10\log_{10}\left(\max\left(10^{\wedge}\left(\frac{SINR_{MIN}(\text{dB})}{10}\right), \gamma_{IoT} \times SINR_{DL} - \alpha\right)\right) - \beta \times 10\log_{10}(TNS)$$

wherein SINR$_{MIN}$ is the minimum rate SINR, $\gamma_{IoT}$ is the control factor for noise and interference, SINR$_{DL}$ is a ratio of a downlink signal over the noise and interference power, α is a factor according to the number of receive antenna at the base station, β is a stream factor indicating whether total number of streams are applicable or not, and TNS is total number of streams in a logical resource unit.

7. The method of claim 6, wherein the $\gamma_{IoT}$ is the control factor for fairness and IoT (Interference plus noise over Thermal noise) and broadcast per frequency partition.

8. The method of claim 1, wherein the uplink power is transmission power per subcarrier for open loop power control.

9. The method of claim 1, wherein the uplink power is transmission power per stream for open loop power control.

10. The method of claim 1, wherein the uplink power is transmission power per transmit antenna for open loop power control.

11. The method of claim 1, wherein the uplink power is determined by equation shown below:

$$P_{tx} = PL + NI + \gamma_{IoT} + SIR_{DL}(\text{or } SINR_{DL}) + \text{OffsetAMS}\_{perAMS} + \text{OffsetABS}\_{perABS}$$

wherein P$_{tx}$ is transmission power level per subcarrier per stream for current transmission, PL is a estimated average current uplink propagation loss, SIR$_{DL}$(or SINR$_{DL}$) is a estimated downlink SIR (signal to interference ratio) or SINR, $\gamma_{IoT}$ is the control factor for fairness and IoT (Interference plus noise over Thermal noise), NI is a estimated average power level of noise and interference per subcarrier at the base station, OffsetAMS$_{perAMS}$ is a correction term for a mobile station specific power offset controlled by the mobile station, and OffsetABS$_{perAMS}$ is a correction term for the mobile station specific power offset controlled by the base station.

12. A mobile station comprising:

a radio frequency (RF) unit receiving a power control message including parameters for uplink power control from a base station; and a processor coupled on the RF unit and controlling uplink power based on the power control message, wherein the processor determines uplink power according to a target SINR, the target SINR is determined by a minimum rate SINR required at the base station and a control factor for noise and interference.

\* \* \* \* \*